United States Patent [19]

Willette et al.

[11] 4,096,319

[45] Jun. 20, 1978

[54] POLYMERS CONTAINING ANTI-OXIDANT FUNCTIONALITY

[75] Inventors: Gordon L. Willette, Doylestown; Richard H. Hanauer, Furlong, both of Pa.

[73] Assignee: Rohm and Haas Company, Philadelphia, Pa.

[21] Appl. No.: 639,739

[22] Filed: Dec. 11, 1975

Related U.S. Application Data

[62] Division of Ser. No. 541,973, Jan. 17, 1975, Pat. No. 3,951,831.

[51] Int. Cl.$^2$ .......................... C08F 8/30; C08F 8/14; C08F 28/06
[52] U.S. Cl. ..................................... 526/16; 260/79.7; 260/302 F; 526/30; 526/259
[58] Field of Search ..................... 526/16, 30, 50, 259, 526/304; 260/79.7

[56] References Cited

U.S. PATENT DOCUMENTS

| | | | |
|---|---|---|---|
| 3,068,239 | 12/1962 | Miller | 260/306 |
| 3,366,613 | 1/1968 | Kelley | 526/304 X |
| 3,428,615 | 2/1969 | Stuart | 526/259 X |
| 3,441,545 | 4/1969 | Blatz | 260/2.1 X |

FOREIGN PATENT DOCUMENTS

| | | | |
|---|---|---|---|
| 722,523 | 1/1955 | United Kingdom | 526/259 |

*Primary Examiner*—Christopher A. Henderson, Jr.

[57] ABSTRACT

Polymers containing anti-oxidant functionality have been found to be useful as viscosity index (VI) improvers for high temperature service. The anti-oxidant moiety prevents extensive oxidative decomposition of the polymer making the polymers particularly useful with lubricating oils used in diesel engines.

7 Claims, No Drawings

POLYMERS CONTAINING ANTI-OXIDANT FUNCTIONALITY

This application is a divisional application of our copending application, U.S. Ser. No. 541,973, filed Jan. 17, 1975, now U.S. Pat. No. 3,951,831.

BACKGROUND OF THE INVENTION

It is well-known that lubricants tend to oxidize when exposed to adverse conditions. In the internal-combustion engine, the temperature of operation, for example, is an important variable since the oxidation rate increases with an increase in temperature. The formulation of lubricants to meet the most severe type of engine operation has been a great challenge, particularly in the area of multigraded oil for diesel engine applications. Additionally, with higher temperatures experienced in gasoline engines resulting from use of pollution equipment and a trend to small, high-revving engines, greater importance is attached now to more thermally and oxidatively stable lubricants for these applications. Thus, fluids which are conventionally conceived for mild diesel applications may find utility in the most severe gasoline engine operations.

Diesel engines, which are used to power a variety of heavy duty vehicles, such as trucks, buses, farm tractors, construction equipment and trains, generally impose severe high temperature service on their lubricants. The temperatures in the upper ring belt zone of the piston reach 500°–700° F. for diesel eqiupment in mild and high supercharged versions; whereas, temperature do not generally exceed 500° F. in gasoline engines.

Correct operation of the diesel engine requires that the piston be properly lubricated and remain free to travel unimpeded in the cylinder, compression being maintained by means of the secure-fitting rings located in the piston grooves. These rings act as lubrication pumps and must be able to move vertically as well as circumferentially in the groove. When the fluid is exposed to the high temperatures of the top groove, decomposition occurs proportionate to the thermal/oxidative stability of the components of the fluid. This decomposition results in resinous, carbonaceous deposits in the groove(s) and on the lands of the piston. If sufficient buildup of deposits occurs, ring sticking results with eventual compression loss, piston scuffing or piston seizure. Thus, an important element in the quality control for a diesel fluid is the specification of a maximum amount of deposit in the top groove and other locations.

Historically, single-grade oils have occupied a preeminent position as recommended fluids for diesel engine application, particularly 30 and 40 weight oils whose base stocks are less volatile than lower SAE grades and would be less likely to volatilize in the hot zones of the piston. Multigraded diesel oils have not achieved acceptance, although diesel engine operation in cold weather would indicate a significant advantage with multigrades. Diesel engines are usually difficult to start, especially in cold weather. The cold-start problems are now remedied by the use of external heaters, an added expense and inconvenience, the use of ether which can result in engine damage since this extremely volatile solvent provides an explosive start with piston movement in the absence of lubrication, or by permitting continuous running when not in use which is wasteful of fuel and harmful from an environmental standpoint. Environmental and energy related considerations, therefore, could lead to a significant demand for multigraded diesel lubricants.

It is widely believed in the petroleum industry that the presence of polymer degrades diesel performance by increasing the amounts of Top Groove Fill (TGF) and lacquer. Their deficiency is the principal reason today that less than ten percent of the diesel lubricants used in this country are multigraded. For the major market, two performance levels are defined, Classification CC (Caterpillar 1-H) and Classification CRD (Caterpillar 1-G), with the 1-G level representing more severe, highly supercharged, engine operation. For level CC, multigrade oils are available but they are not widely used due to higher costs and general reluctance to the use of polymer. Today, there are no multigraded level CD lubricants, and the technology for formulating them in a completely satisfactory way is not known. A new polymer providing completely acceptable multigraded 1-H and 1-G performance without introducing a severe cost penalty would represent a major breakthrough.

We have now discovered novel and new VI* improvers which provide a significant improvement in high temperature diesel engine operation. This advance has been achieved by incorporating antioxidant functionalities directly into a suitable polymer. As such, the antioxidant moiety prevents extensive oxidative decomposition of the polymer and also other fluid additives, thus reducing the tendency to lacquer, TGF formation and land deposits. Incorporation of the subject polymers of this invention in diesel lubricants greatly enhances the possibility of the adoption of multigraded oils for both mild and severe diesel operation.

*VI is the abbreviation for viscosity index in this application.

One of the objects of the present invention is the use of antioxidant-containing VI improvers in crankcase lubricant formulations to increase the stability and improve the performance of such lubricants under high temperature engine operating conditions.

Another object is a method of preparing an antioxidant-containing VI improver polymer by esterifying a carboxylic acid-containing polymer with an N-methyl hydroxyethyl amide-containing antioxidant.

PREFERRED EMBODIMENTS

The antioxidant-containing polymers of greatest interest are those prepared via the esterification procedure indicated by the following general reaction or by transesterification:

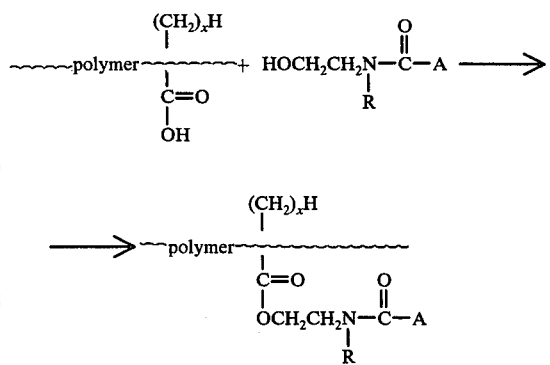

where A is an antioxidant-containing structure, $x$ is 0 or 1, and R is H or a $C_1$ or $C_{12}$ straight chain or branched alkyl.

The polymer structure should include any reasonable combination of monomers commonly used to make oil soluble polymers as VI improvers. The following combination would be typical: copolymers of acrylic, methacrylic, maleic, fumaric or stearic acid with an oil solubilizing combination of oil soluble monomers, such as alkyl acrylates, alkyl methacrylates, styrene, alkylated styrenes, alkyl fumarates, alkyl itaconates, vinyl esters of fatty acids, ethylene, propylene butenes and higher $\alpha$-olefins.

The antioxidant structures "A" of most importance are those having the following formulas (a) and (b):

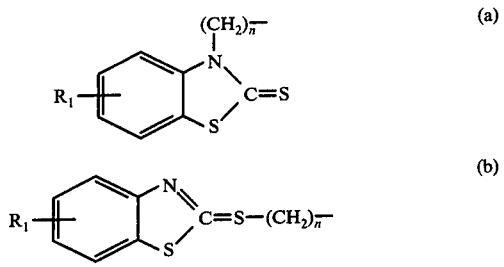

wherein $n$ is 1 or 2, and $R_1$ is H or a $C_1$ to about $C_{20}$ alkyl.

The structures or formulas above are labeled (a) or (b) for convenience.

Antioxidant-containing copolymers with the same type of polymer components and antioxidant components as mentioned above may be made via a copolymerization of an oil solubilizing monomer with an antioxidant-containing monomer. Examples of such antioxidant-containing monomers are monomers of formulas (c), (d), (e) and (f) as follows:

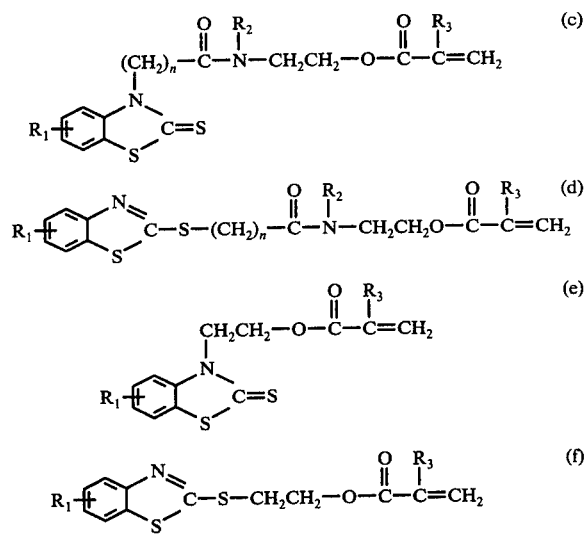

where $R_1$ has the significance previously noted, i.e., $R_1$ is H or a $C_1$ to about $C_{20}$ alkyl; where $n$ has the significance previously given to it, i.e., $n$ is 1 or 2; where $R_2$ is H or a $C_1$ to $C_{12}$ alkyl group; and where $R_3$ is H or $CH_3$.

The most pertinent prior art falls into two categories: 1) stabilization of lubricants with small molecule antioxidants, and 2) antioxidant-containing polymers (few of which have been claimed to specifically stabilize oils or lubricants).

In the prior art, stabilization of lubricants and oils by small molecule antioxidants is widely documented in the patent literature. Listing specific examples does not seem necessary, but it can be stated that most examples fall into either of two classes: free radical chain inhibitors (hindered phenols, aromatic amines, phenothiazines) or peroxide decomposers (phosphorous/sulfur compounds, dithiocarbamates). Occasionally, metal deactivators such as mercaptobenzothiazoles are mentioned. For example U.S. Pat. No. 3,215,641 discusses a class of 2-(4-hydroxybenzylthio)-benzothiazoles.

The subject of antioxidant-containing polymers is much less widely documented. However, what information is available can be broken down into two categories: (1) polymers whose antioxidant moiety has been attached to the backbone via a post reaction on a preformed polymer and (2) incoporation of an antioxidant moiety through copolymerization of an antioxidant monomer.

There are several patent references in the coatings field which claim the use of $\beta$-hydroxyamide/acid polymer post-reactions. These are Belgian Pat. No. 757,271 (Balm Paints) and patent application Ser. No. 454,645, now abandoned. Neither of these discusses the use of antioxidants nor viscosity index improvers, and generally involve the use of crosslinked polymer systems.

One can conclude from a search of the literature that, although polymeric antioxidants are not new and have been prepared by both copolymerization and post-reaction routes, their application to lubricant oil stabilization, especially as a multifunctional viscosity index improver, is rather unique.

Most of the prior art of lubricant stabilization consists of the use of small molecule antioxidants. This method has long been popular because of the ease of blending a mixture of relatively inexpensive additives into an oil system. The use of small molecule stabilizing agents in high temperature applications, however, suffers from the disadvantage that the volatile stabilizing agent can easily escape from the system.

One method of making stabilizers for polymeric systems non-volatile is to chemically attach them to the target polymer. The use of polymeric antioxidants in the rubber industry has clearly demonstrated the advantages of polymer-bound antioxidants (Rubber Chem. Technol. 46,96 (1973), U.S. Pat. No. 3,658,769). These materials do not escape from the rubber during service yet maintain their activity for long periods of time. A similar demonstration of the advantages of polymer-bound functional groups can be found in British Pat. No. 848,354 which covers the use of U.V. stabilizers in plastics.

The advantages of applying the use of non-volatile polymeric antioxidants in the lubricant systems of internal-combustion engines are apparent when one considers the very high temperatures that the lubricant can experience and the ease in which volatile small molecules can be lost from thin lubricant films. In addition, as polymer tends to concentrate in the piston grooves due to the flashing off of volatile oil components, the antioxidant moiety is simultaneously concentrated. This can be beneficial since the piston grooves are areas where antioxidant protection is most needed.

These advantages can be demonstrated from the data in the following Table I: the mercaptobenzothiazole (MBT) polymer shows repeated effectiveness in controlling top groove deposits (e.g. Top Groove Fill: 1-H, standard — 70%, MBT — 13%; 1-G, standard — 71%, MBT — 39%).

In the examples and tests and throughout the specification and claims, all parts and percentages are by weight unless otherwise stated.

EXAMPLE 1

Part A — Mercaptobenzothiazole, 276 g. (1.65 moles), and 1500 ml. methanol were charged to a 5-liter flask at 25° C. and 368 g. (1.70 moles) of a 25% sodium methoxide in methanol solution was added dropwise, over 10 minutes, as the solution became clear and exothermed to 29° C. Sodium iodide, 25.5 g. (.170 mole) was added, followed by 185 g. (1.70 moles) methyl chloroacetate, which was added dropwise as the temperature exothermed to 39° C., and white precipitate formed. The reaction mixture was refluxed 3 hours, whereupon 500 ml. each of water and benzene were added. With the solution kept warm, the aqueous phase was separated and discarded, and the benzene layer was dried over sodium sulfate, filtered and stripped to afford 385 g. crystalline solid, melting point 71.0°–74.5° C. (97% yield). An infrared spectrum of this material was consistent with that expected from methyl benzothiazolylmercaptoacetate.

The above ester, 385 g. (1.64 moles), 124 g. (1.65 moles) of N-methylethanolamine, and 415 ml. xylene were charged to a 2-liter flask and refluxed 2 hours. The reaction mixture was stripped at 150° C. and 0.5 mm. Hg to yield a viscous oil which was recrystallized from a benzene/diethyl ether mixture to afford 327 g. crystalline solid, melting point 95.5°–97.0° C. (71%). An infrared spectrum of this material was consistent with that expected from N-methyl-N-(β-hydroxyethyl) benzothiazolymercaptoacetamide.

Part B — A solution of 1485 g. tridecyl methacrylate, 45 g. methacrylic acid, 450 g. 100 neutral oil, 4.5 g. 50% active paramenthane hydroperoxide, 4.5 g. 25% active kemamine and 0.45 g. dodecyl mercaptan were charged to a 5-liter flask, which was then swept with nitrogen. The reaction mixture was heated to 118° C. At each of three 40-minute intervals after polymerization had begun, catalyst additions, consisting of 2.25 g. 50% active paramenthane hydroperoxide, 2.25 g. 25% active kemamine and 75 g. 100 neutral oil, were made. Forty minutes after the last catalyst addition, 600 ml. of xylene and 162 g. β-hydroxyamide from Part A (1.1 equivalents on methacrylic acid) were added, the solution heated to 175° C. and refluxed for about 2.5 hours, while removing water in a Dean-Stark trap. After water evolution had ceased, the xylene was removed under vacuum (0.1 mm. Hg., 175° C. maximum pot temperature), and the solution was diluted with 100 neutral oil to the desired solids level. The performance of a lube oil blend of this product is shown in Table I, Blend No. 2.

In Table I, 4½% by weight of the overall polymer in a suitable lubricating oil is tested. In Table II, about 3½% by weight of the overall polymer in a suitable lubricating oil is used. In both tests, the amount of mercaptobenzothiazole and methacrylic or acrylic acid constitutes about 14% by weight. In general diesel use, about 1 to about 10 by weight and, more preferably, about 2 to about 6% by weight of the whole polymer is used in the lubricating oil. The mercaptobenzothiazole plus methacrylic or acrylic acid (or other acid component) in use or service is used so that about 2 to about 30% by weight and, more preferably, about 8 to about 15% by weight is present in the polymer. This corresponds to about 1 to about 15% mercaptobenzothiazole in the polymer, and more preferably, about 4 to about 7% mercaptobenzothiazole in the polymer. The acid component in the polymer can vary over a fairly wide range. For example, in the case of methacrylic acid, it can range from about 0.5 to about 10% by weight in the polymer.

TABLE I

| Modified (120 hr.) Caterpillar 1-H Engine Tests | | | |
|---|---|---|---|
| Blend | Volume % Top Groove Fill (0 = clean) | 2nd Land, % Area Clean (100 = clean) | Overall Merit Rating (100 = clean) |
| Standard methacrylate polymer | 70 | 34 | 89.7 |
| Methacrylate polymer with copolymerized mercaptobenzothiazole moiety | 13 | 40 | 93.8 |
| Modified (120 hr.) Caterpillar 1-G Engine Tests | | | |
| Standard methacrylate polymer | 71 | 12 | 21.3 |
| Methacrylate polymer with copolymerized mercaptobenzothiazole moiety | 39 | 61 | 85.4 |

TABLE II

| Standard Caterpillar 1-H Engine Tests (conducted by SWRI) | | | |
|---|---|---|---|
| Blend | Volume % Top Groove Fill (0=clean) | Top Land, % Area Clean (100=clean) | Weighted Demerits (0=clean) |
| | Results at 480 hrs. unless otherwise indicated. | | |
| Standard methacrylate polymer | 78 | 45 | 162.4 |
| Standard methacrylate polymer | 74 (240 hrs.) | 54 (240 hrs.) | 196.6 (240 hrs.) |
| Methacrylate polymer with copolymerized mercaptobenzothiazole moiety | 26 | 94 | 66.2 |
| Methacrylate polymer with copolymerized mercaptobenzothiazole moiety | 33 | 95 | 41.7 |

Federal Test Method (F.T.M) Standard No. 791 — Method 346.1

Caterpillar 1-H and 1-G Lubricant Evaluation

High Speed Supercharged Engine Evaluation 480 Hour Endurance Run

Introduction

The evaluation of the high temperature detergency and wear properties of the lubricant is accomplished by a high speed and load, diesel engine test, Caterpillar 1-H. This technique is essentially a modification of the Caterpillar 1-G test that has been used by industry for evaluation of Series 3 oils. The major difference between the 1-H and 1-G procedures is somewhat reduced severity so that lower deposition levels result from the 1-H evaluation.

Equipment

A single-cylinder "Caterpillar" diesel test engine equipped with EX-7999 High Speed Changeover Group is used in the Caterpillar 1-H test.

This changeover group modifies the engine to a 5⅛ inches bore and 6½ inches stroke, and is installed on those engines built according to the EX-7500 engine arrangement.

Discussion

The Caterpillar 1-H evaluation is conducted to determine the effect of the lubricant on ring sticking, wear and accumulation of deposits during a 480-hour endurance run. This evaluation was run in accordance with the supercharged Caterpillar 1-H procedure, and the operating conditions were those specified for the supercharged test. A diesel fuel of 0.35% minimum sulfur content was used.

The Caterpillar 1-G evaluation was conducted to determine the effect of the lubricant on ring sticking, wear and accumulation of deposits during a 480-hour endurance run. This evaluation was run in accordance with the conditions specified in Caterpillar Test No. 1-G ASTM Publication 509. The operating conditions were those specified for the supercharged test, and a fuel of 0.35% minimum sulfur content was used.

Another advantage of placing antioxidants in the polymer backbone is the solubility benefit. Most small molecule antioxidants, such as mercaptobenzothiazole, are highly polar and, thus oil insoluble. In most cases, these functional groups can only be made soluble by attaching very long alkyl side chains such as $C_{18}$ (stearyl) groups. This method can be expensive and imparts much added weight to the antioxidant molecule. By attaching the antioxidant to an oil soluble viscosity index improver (which is already present in a multigraded lubricant) via the use of a relatively short coupling moiety, the antioxidant can be kept in oil solution, even if the functional groups become more polar from oxidation. The post-reaction technique of esterifying methacrylic acid-containing polymers with functionalized β-hydroxyamides is a useful method of antioxidant attachment through small chain segments. Attaching the funtional group to a polymer instead of using long oil solubilizing side chains also helps avoid increases in the oil formulation viscosities at low temperatures by virtue of reducing the number of viscosity-contributing molecules in the system.

The process of esterifying carboxylic acid-containing viscosity index improvers with functional groupas which carry a β-hydroxyamide "handle" offers numerous advantages over conventional methods of introducing functional groups into high molecular weight polymers. Both the substrate acid-containing polymer and the β-hydroxyamide containing functional group can easily be made by well-known techniques. The post-reaction itself is a rapid, self catalyzed esterification that can be carried out at moderate temperatures with a minimum of solvent. The only by-product of the reaction is water, which can be easily removed from the reaction system to help drive the esterification to virtually 100% completion. In addition, no catalyst fragments, such as acids, bases or inorganic salts, have to be removed. Crosslinking reactions do not occur; therefore, the molecular weight of the substrate polymer does not change during post-reaction. The post-reaction can be conducted in the presence of oil, which is a convenient solvent and diluent for viscosity index improvers. Virtually any type of functional group that is not water sensitive at elevated temperatures can be introduced into a high molecular weight polymer by this technique. Conventional copolymerization methods suff from the sensitivity of copolymerization reactions to the presence of a great many functional groups, such as inhibitors or chain transfer agents. Adding such groups to already formed polymer makes it easier to prepare high molecular weight polymer at high conversions using conventional polymerization catalysts and techniques.

We claim:

1. An antioxidant ester of a carboxylic acid-containing oil soluble polymer useful at high temperatures in lubricating oils for VI improving and anti-oxidant properties and having the general formula:

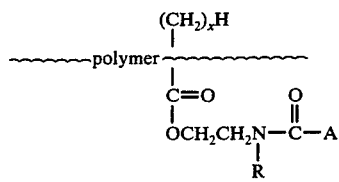

wherein $x$ is 1 or 2, R is H or a $C_1$ to $C_{12}$ straight chain or branched alkyl group, and A is an antioxidant structure of one of the following formulas, (a) or (b), or a mixture thereof:

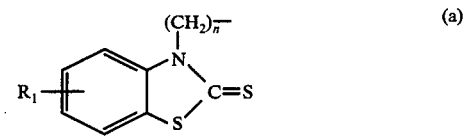

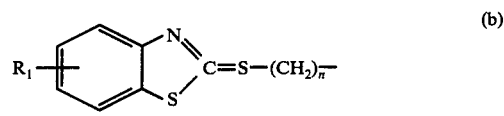

where $n$ is 1 or 2, and $R_1$ is H or a $C_1$ to about a $C_{20}$ alkyl group.

2. An oil soluble antioxidant-containing VI improver polymer containing an ethylenically unsaturated as copolymerized units (1) a carboxylic acid-containing oil solubilizing monomer and (2) a heterocyclic monomer selected from monomers of the following formulas (c), (d), (e) and (f):

wherein $R_1$ is H or $C_1$ to about $C_{20}$ alkyl, $n$ is 1 or 2, $R_2$ is H or a $C_1$ to $C_{12}$ alkyl group, and $R_3$ is H or $CH_3$.

3. A polymer as in claim 2 wherein the heterocyclic monomer is a monomer of formula (c).

4. A polymer as in claim 2 wherein the heterocyclic monomer is a monomer of formula (d).

5. A polymer as in claim 2 wherein the heterocyclic monomer is a monomer of formula (e).

6. A polymer as in claim 2 wherein the heterocyclic monomer is a monomer of formula (f).

7. A polymer as in claim 2 wherein oil solubilizing monomer (1) is a methacrylate monomer.

* * * * *